(12) United States Patent
Derras et al.

(10) Patent No.: US 9,407,472 B1
(45) Date of Patent: Aug. 2, 2016

(54) FAST TRANSVERSAL MULTI-INPUT SYSTEM

(71) Applicant: Seagate Technology LLC, Cupertino, CA (US)

(72) Inventors: Belkacem Derras, Longmont, CO (US); William Michael Radich, Longmont, CO (US); Rishi Ahuja, Broomfield, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/308,461

(22) Filed: Jun. 18, 2014

(51) Int. Cl.
*H03H 7/30* (2006.01)
*H04L 25/03* (2006.01)

(52) U.S. Cl.
CPC .................. *H04L 25/03057* (2013.01)

(58) Field of Classification Search
CPC .................. H04B 1/0017; H04B 7/0842
See application file for complete search history.

(56) References Cited

U.S. PATENT DOCUMENTS

| | | | | |
|---|---|---|---|---|
| 7,813,423 | B2 * | 10/2010 | Garth et al. | 375/233 |
| 2001/0033341 | A1 * | 10/2001 | Limberg | 348/614 |
| 2002/0051087 | A1 * | 5/2002 | Limberg et al. | 348/611 |
| 2002/0122397 | A1 * | 9/2002 | Ling et al. | 370/335 |
| 2002/0178420 | A1 * | 11/2002 | Gagnon | 714/776 |
| 2004/0146100 | A1 * | 7/2004 | Chang et al. | 375/233 |
| 2007/0133712 | A1 * | 6/2007 | Benjebbour et al. | 375/295 |
| 2009/0058728 | A1 * | 3/2009 | Mostafa et al. | 342/380 |
| 2011/0164671 | A1 * | 7/2011 | Matsumura | 375/229 |

FOREIGN PATENT DOCUMENTS

WO 2005057870 6/2005

OTHER PUBLICATIONS

Cremene, Multiple-Input Adaptive Aombiner-Equalizer for Wireless Comunications, vol. 49, No. 4, 2008 http://www.academia.edu/3242329/MULTIPLE-INPUT_ADAPTIVE_COMBINER-EQUALIZER_FOR_WIRELESS_COMMUNICATIONS.
Burg, Practical Low Complexity Linear Equalization for MIMO-CDMA Systems, Integrated Systems Laboratory http://citeseerx.ist.psu.edu/viewdoc/download?doi=10.1.1.329.5253&rep=rep1&type=pdf.
Torabi, Pre-Equalization for MISO DS-UWB Systems with Pre-Rake Combining, IEEE Transactions on Wireless Comunications, vol. 8, No. 3, Mar. 2009 http://www.ece.ubc.ca/~janm/Publications/jour_twc08_2.pdf.

(Continued)

*Primary Examiner* — Santiago Garcia
(74) *Attorney, Agent, or Firm* — Cesari & Reed, LLP; Kirk A. Cesari

(57) ABSTRACT

Multiple input single output (MISO) systems and processes are presented that can adaptively equalize multiple signals to produce an output. In some examples, the MISO systems can include a fast transversal recursive least square (RLS) algorithm to produce the output. Fast transversal RLS algorithms can be less complex than other RLS algorithms. In some examples, the fast transversal RLS algorithm may be optimized to have no division operations. The MISO system may have two or more inputs.

17 Claims, 6 Drawing Sheets

(56) References Cited

OTHER PUBLICATIONS

Moazzami, An Adaptive Blind Equalizer With Signal Separation for a MIMO System Transmitting QAM Signals, Dept. of Electrical & Computer Engineering, Morgan State University http://www.ilunwen.com/translation/20100412/20100412163241hcbjifsv.pdf.

Mohsenian-Rad, Optimal MISO UWB Pre-Equalizer Design with Spectral Mask Constraints, International ITG Workshop on Smart Antennas, 2010 http://ieeexplore.ieee.org/xpl/login.jsp?tp=&arnumber=5456440&url=http%3A%2F%2Fieeexplore.ieee.org%2Fiel5%2F5452821%2F5456374%2F05456440.pdf%3Farnumber%3D5456440.

\* cited by examiner

600

| Parameter (filter 1) | Parameter (filter n) | Description |
|---|---|---|
| M | M | Order of the MISO filter |
| $x_1(k)$ | $x_n(k)$ | Input signal from ADCs |
| $w_{f1}(k,M)$ | $w_{fn}(k,M)$ | Forward prediction filter at time "k" |
| $w_{b1}(k,M)$ | $w_{bn}(k,M)$ | Backward prediction filter at time "k" |
| $e_{f1}(k,M)$ | $e_{fn}(K,M)$ | Forward apriori prediction error at time "k" |
| $e_{b1}(k,M)$ | $e_{bn}(K,M)$ | Backward apriori prediction error at time "k" |
| $\varepsilon_{f1}(k,M)$ | $\varepsilon_{fn}(k,M)$ | Forward aposteriori prediction error at time "k" |
| $r_{f1}(k,M)$ | $r_{fn}(k,M)$ | Correction term for the extended gain vector at time "k" |
| $r_{b1}(k,M)$ | $r_{bn}(k,M)$ | Scaling factor for the gain vector at time "k" |
| $\zeta_{fin1}(k,M)$ | $\zeta_{finn}(k,M)$ | Forward MMSE at time "k" |
| $\gamma_{f1}(k,M)$ | $\gamma_{fn}(k,M)$ | Correction term for the gain vector at time "k" |
| $K_1(k,M)$ | $K_n(k,M)$ | Gain vector at time "k" |
| $K_1(k,M+1)$ | $K_n(k,M+1)$ | Extended gain vector at time "k" |
| d(k) | | Desired MISO output at time "k" |
| e(k,M) | | Overall MISO error |
| w(k,nM) | | Overall tap vector for MISO with 2M taps at time "k" |
| y(k) | | Overall MISO output at time "K" |
| $\upsilon$ | | Constant determined by preliminary testing |

FIG. 6

FAST TRANSVERSAL MULTI-INPUT SYSTEM

SUMMARY

In some embodiments, an apparatus can comprise a circuit including a first input to receive a first signal, a second input to receive a second signal, and filter circuits adapted to determine weighting coefficients based on the first and second signals and an error signal. Further, the apparatus can have a second filter circuit adapted to modify the first and second signals via the weighting coefficients to produce filtered signals. The apparatus may have a combiner circuit configured to combine the filtered signals to produce a combined signal, and an output to provide the combined signal.

In some embodiments, an apparatus can comprise a circuit including a first input to receive a first signal, another input to receive another signal, a first forward error calculator circuit adapted to calculate a first extended gain vector based on the first signal, and another forward error calculator circuit adapted to calculate another extended gain vector based on the another signal. The apparatus can further comprise a first backwards error calculator circuit adapted to calculate a first gain vector based on the first extended gain signal, another backwards error calculator circuit adapted to calculate another gain vector based on the another extended gain vector, and a multiple input combiner circuit adapted to calculate an output signal, an error signal, and an overall tap vector based on the first signal, the another signal, the first gain vector, and the another gain vector.

In some embodiments, a method can comprise receiving a first signal at a first input, receiving another signal at another input, filtering the first signal via a recursive least square (RLS) process to produce a first filtered signal, and filtering the other signal via the RLS process to produce another filtered signal. The method can further comprise combining the first filtered signal and the other filtered signal to produce an output signal, and combining the output signal with a reference signal to produce an error signal.

BRIEF DESCRIPTION OF THE DRAWINGS

FIG. 6. is a parameter table for fast transversal MISO systems, in accordance with certain embodiments of the present disclosure.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Multiple input, single output (MISO) systems can have multiple input signals, such as from multiple antennas, that can be combined to minimize errors and optimize data. The multiple inputs can be two or more inputs. For example, sound recording systems may receive input signals from multiple microphones or from musical instruments. The multiple input signals may be combined to produce a single output signal via MISO system that can optimize signals from two or more sources, such as by equalizing the signals by applying a weighting factor to each input signal before the signals are combined.

Figure 1:
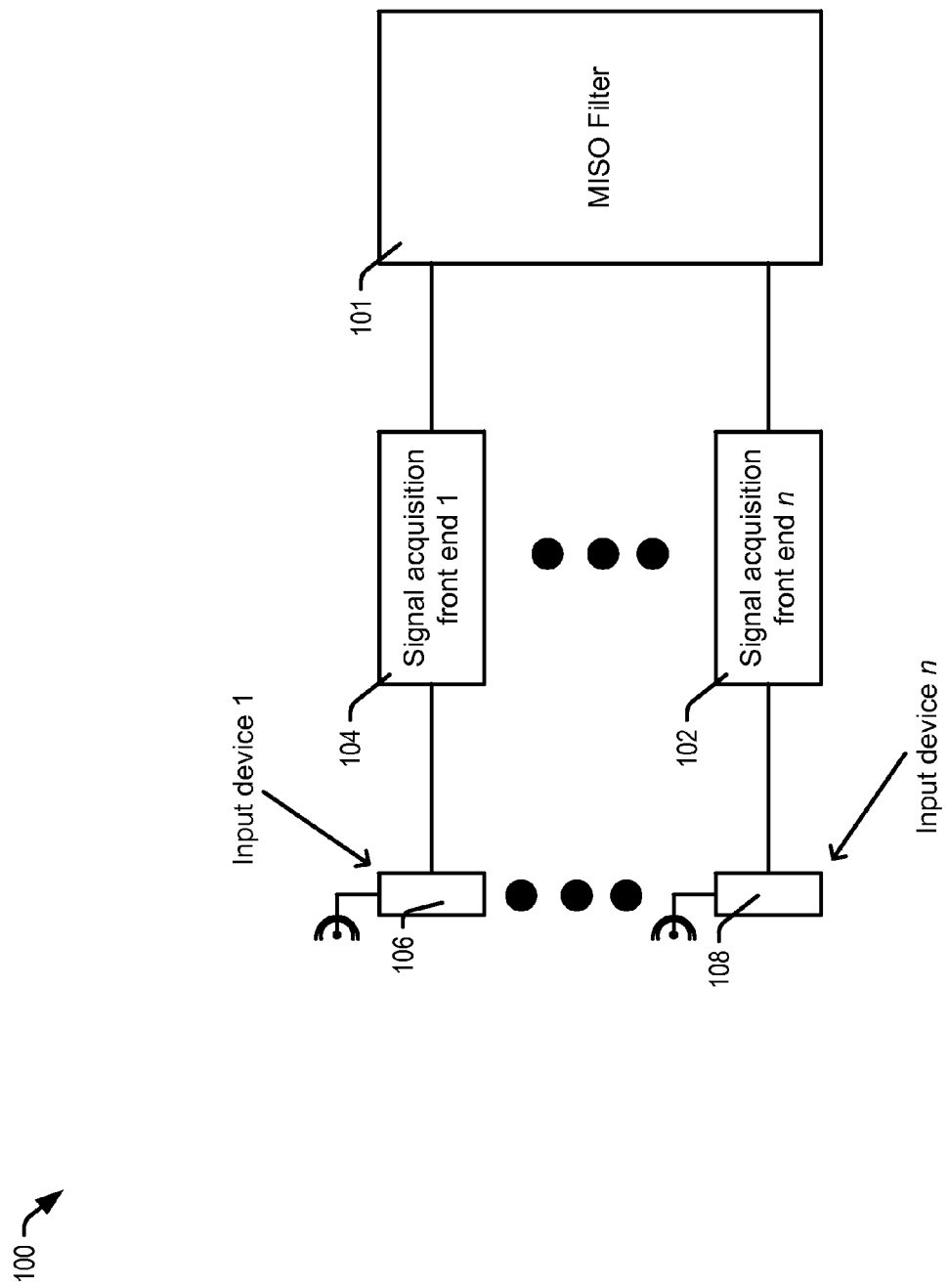
FIG. 1. is a system with a fast transversal MISO system, in accordance with certain embodiments of the present disclosure.

Referring to FIG. 1, a system with a fast transversal MISO system a system with a fast transversal MISO system is shown and generally designated 100. System 100 can include input devices 106 and 108, signal acquisition front end one 104, signal acquisition front end n 102 (n is the number of MISO inputs), and MISO filter circuit 101.

Input devices 106 and 108 may be transducers, antennae, optical receivers, data converters, voltage detectors, current detectors, amplifiers, other devices, or any combination thereof. Input devices 106 and 108 can be different types of detectors (e.g. input device 106 can be an antenna and input device 108 can be a transducer), and in some systems (e.g. system 100), can have two or more inputs.

The input signals from input devices 106 and 108 can be coupled to signal acquisition front ends one 104 and n 102, respectively. Signal acquisition front ends one 104 and two 102 can condition (e.g. buffer, convert, encode/decode, decrypt, etc.) the input signals, and can include analog to digital converters (ADCs), decoders, buffers, other circuits, or any combination thereof. Further, signal acquisition front ends one 104 and n 102 may be circuits, firmware, software, application specific integrated circuits, systems on chip, other circuits, or any combination thereof. In some embodiments, two or more input devices can be coupled to a single signal acquisition front end.

MISO filter circuit 101 can be coupled to the signal acquisition front ends 104 and 102, and can apply a weighting factor to the output signals of the front ends 104 and 102. The weighting factor applied to front end 102 may be the same or different than the weighting factor applied to front end 104. The MISO filter circuit 101 can combine the signals to produce a single output signal, which may be provided to a processor, channel, buffer, other circuit, or any combination thereof. The equalization operations of the MISO filter circuit 101 can be based on algorithms, such as least mean squares (LMS) algorithms, and recursive least-squares (RLS) algorithms Least mean squares (LMS) algorithms can be efficient; the number of operations required to arrive at a solution may be lower than with other algorithms. The convergence rate (the rate at which a solution is determined) can be slower than with other algorithms. Recursive least-squares (RLS) algorithms may be less efficient (e.g. more complex) than LMS algorithms, but the convergence rate can be much faster. Fast transversal RLS (FT-RLS) algorithms can be less complex than RLS algorithms; FT-RLS complexity can be represented as $O(M)$ for each input, RLS complexity can be $O(M^2)$ for each input, where M is the number of taps (coefficients) in a digital filter (e.g. finite impulse response (FIR) filter). For example, an FT-RLS algorithm can include 7M+13 multiplications, 7M+3 additions, and three divisions per iteration, for each input.

Adaptive algorithms may be implemented by a circuit, firmware, as instructions executable by a processor (e.g. software), other means, or any combination thereof.

Figure 2:
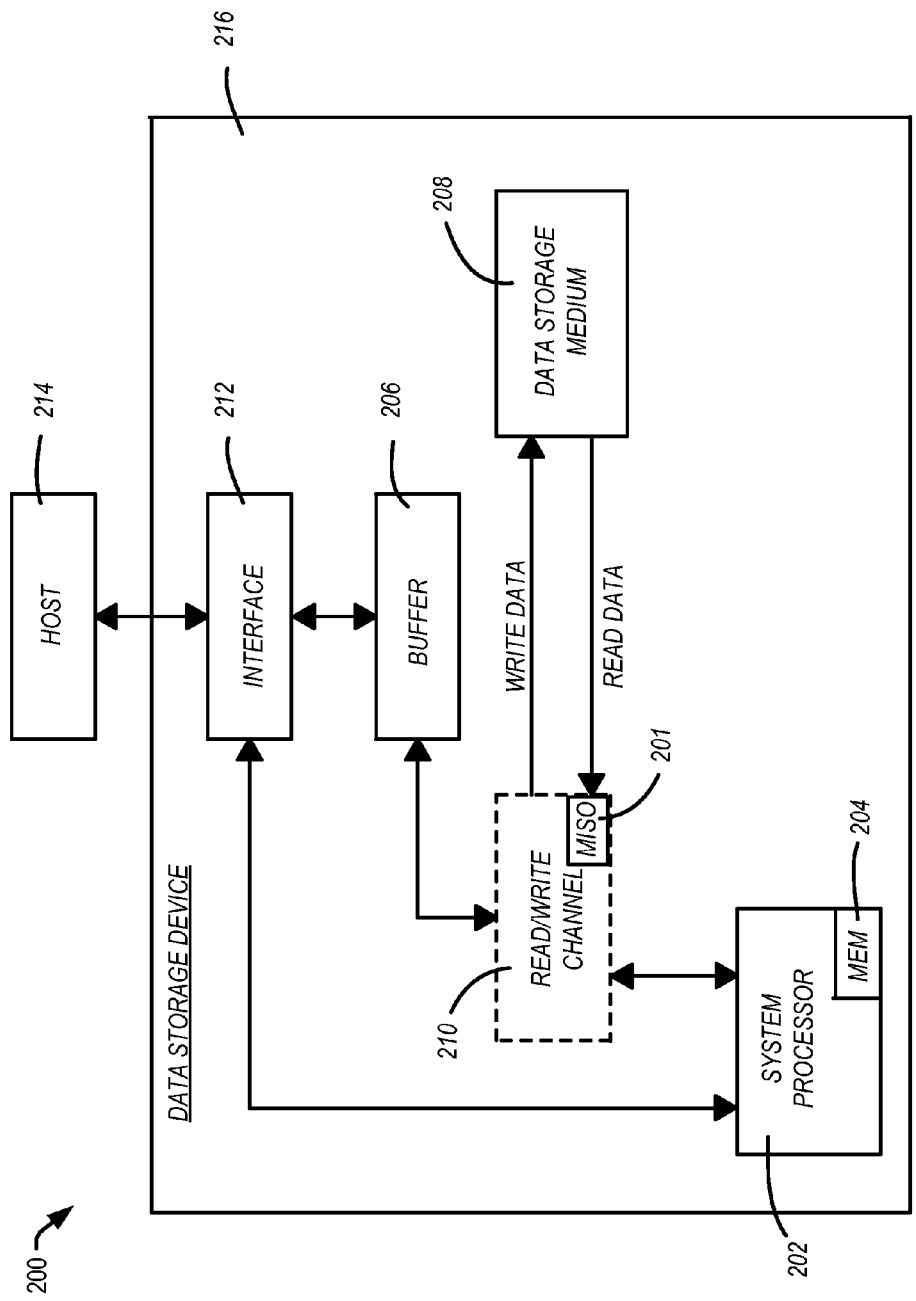
FIG. 2. is a system of adaptively combining waveforms, in accordance with certain embodiments of the present disclosure.

Referring to FIG. 2, a system of adaptively combining waveforms is shown and generally designated 200. The system 200 can be an example of a data storage device (DSD), and may be an embodiment of an implementation of system 100. The DSD 216 can optionally connect to be removable from a host device 214, which can be a device or system having stored data, such as a desktop computer, a laptop computer, a server, a digital video recorder, a photocopier, a telephone, a music player, other electronic devices or systems not listed, or any combination thereof. The data storage device 216 can communicate with the host device 214 via the hardware/firmware based host interface circuit 212 that may include a connector (not shown) that allows the DSD 216 to be physically connected and disconnected from the host 214.

The DSD 216 can include a system processor 202, which may be a programmable controller, and associated memory 204. The system processor 202 may be part of a system on chip (SOC). A buffer 206 may temporarily store data during read and write operations and can include a command queue. The read/write (R/W) channel 210 can encode data during write operations and reconstruct data during read operations to and from the data storage medium 208. The data storage medium 208 may be a magnetic medium, such as a hard disc, flash medium, optical medium, or other medium, or any combination thereof.

The R/W channel 210 may receive data from more than one data storage medium at a time, and can also receive data concurrently from more than one output of a single storage medium. For example, storage systems having two-dimensional magnetic recording (TDMR) systems can have two recording heads, and can read from two tracks simultaneously. Multi-dimensional recording (MDR) systems can receive two or more inputs from multiple sources (e.g. recording heads, flash memory, optical memory, and so forth).

The MISO filter circuit 201 can be an equalizer (e.g. filter) and combine the input signals produced by the data storage medium 208 using an FT-RLS adaptive algorithm. The FT-RLS adaptive algorithm, when used in the MISO filter circuit 201, can minimize channel errors by applying weighting factors to each input signal and combining the weighted signals to produce an equalized or filtered signal. The weighting factor applied to an input signal may be the same or different than the weighting factor applied to another input signal. In some embodiments, the MISO filter circuit 201 may be a separate circuit, integrated into the R/W channel 210, included in a system on chip, firmware, software, and so forth.

Figure 3:
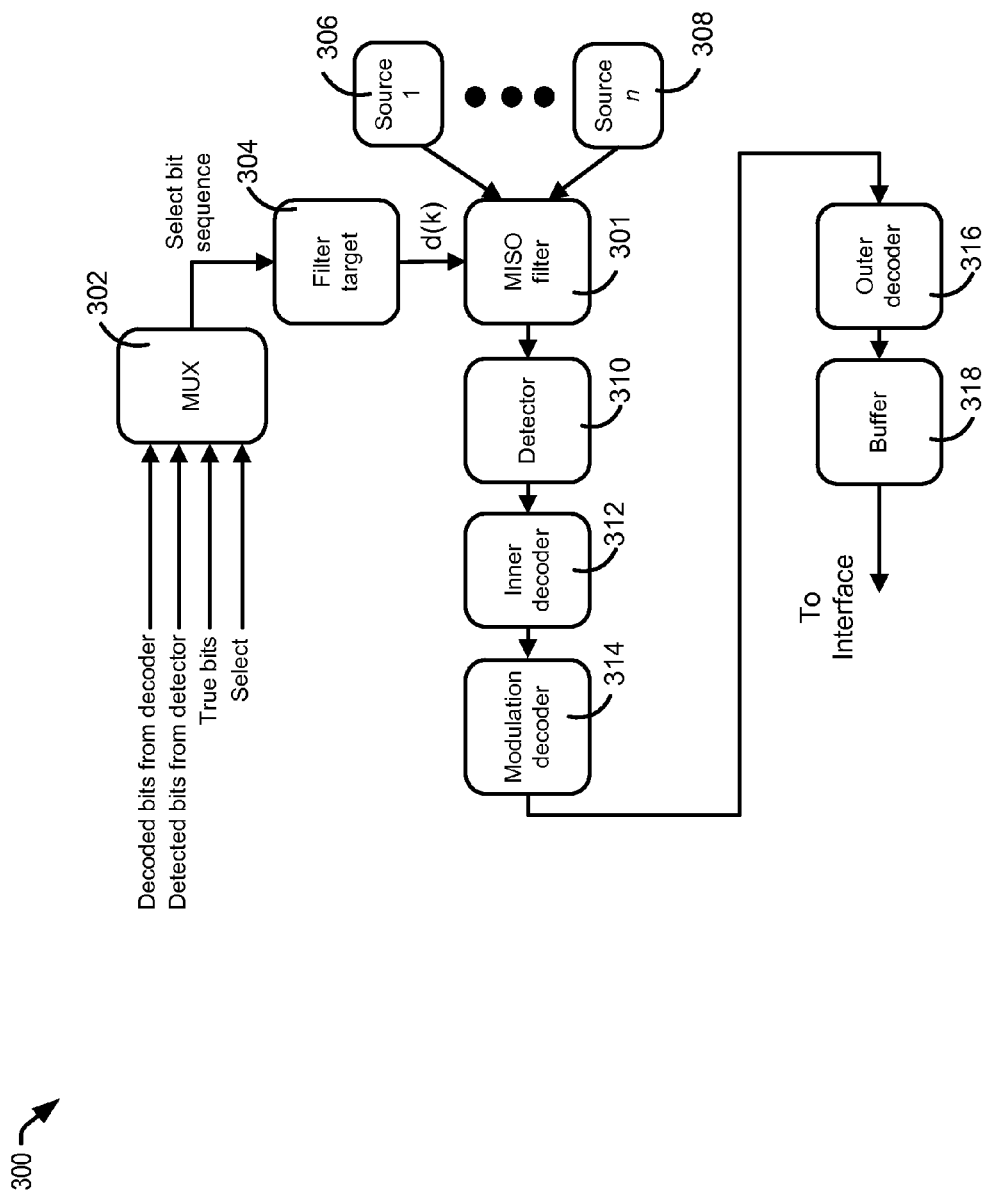
FIG. 3. is a system of adaptively combining waveforms, in accordance with certain embodiments of the present disclosure.

Referring to FIG. 3, a system of adaptively combining waveforms is shown and generally designated 300. The system 300 can be an embodiment of R/W channel 210 in a data storage system. System 300 may include n input sources A1 306 up to An 308, which may be the channel sources 106 or 108, the signal acquisition front ends 102 or 104, data storage medium 208, other source, or any combination thereof. The input sources 306 and 308 can be coupled to a MISO filter (equalizer) circuit 301, which can be an embodiment of MISO filter circuits 101 or 201.

The system 300 can include a detector 310, inner decoder 312, modulation decoder 314, outer decoder 316, and buffer 318. MISO filter circuit 301 can combine signals from n sources $A_1$ 306 ... $A_n$ 308, with target signal d(k) to produce an equalized signal. The equalized signal can be detected by the detector 310, which may be a Viterbi detector, soft-output Viterbi detector, Bahl-Cocke-Jelinek-Raviv (BCJR), or other detector. In some embodiments, the MISO filter circuit 301 may be integrated with the detector 310. The signal may be decoded by an inner decoder 312, which can decode inner codes, a modulation decoder 314, which can decode modulation codes, and an outer decoder 316, which can decode outer codes. A buffer 318 can store the signal, and provide it to a circuit, such as an interface, transmitter, memory, storage device, processor, other circuit, or any combination thereof, upon receipt of instructions or detection of a trigger. In some embodiments, the MISO filter circuit 301 may be integrated with the detector 310, decoders 312-316, other circuits, or any combination thereof. In some examples, the types, number, or order of channel components may be different; the MISO filter circuit 301 can be implemented with decoders, detectors, or other circuits not shown.

Filter target circuit 304 can be a programmable finite impulse response (FIR) filter having two coefficients (taps); in some examples, the filter target circuit 304 can have three or more coefficients. The filter target circuit 304 can produce, d(k), based on decisions from a detector (e.g. detector 310), decoder (e.g. decoder 312, 314, or 316), or a training sequence (true bits), during calibration. Calibration may occur during production, or during or after an event such as transport, change of hardware, change of environment, software changes, and so forth. In some embodiments, a multiplexer (MUX) 302 can receive detected bits from a detector, decoded bits from a decoder or true bits from a training system, and a select signal to select which input signal to provide to the filter target circuit 304, which can be integrated with the MISO filter circuit 301.

In some embodiments of system 300, some or all of the functions of the components (e.g. 302-318) can be performed by the MISO filter circuit 301. In some data channel systems, some or all of the components may be different. MISO filter can be applied to communication systems where multiple input signals can be combined into one output signal. For example, the MISO filter circuit 301 can be configured to combine signals from wireless communication systems (e.g. cellular phone systems, satellite communication systems, digital radio, internet communication systems such as 802.11x, etc.), sound navigation and ranging (SONAR), or radio detection and ranging (RADAR). The MISO filter circuit 301 can also be configured to combine signals from other systems such as data storage systems, audio/video systems, medical systems, or other systems, or any combination thereof.

Figure 4:
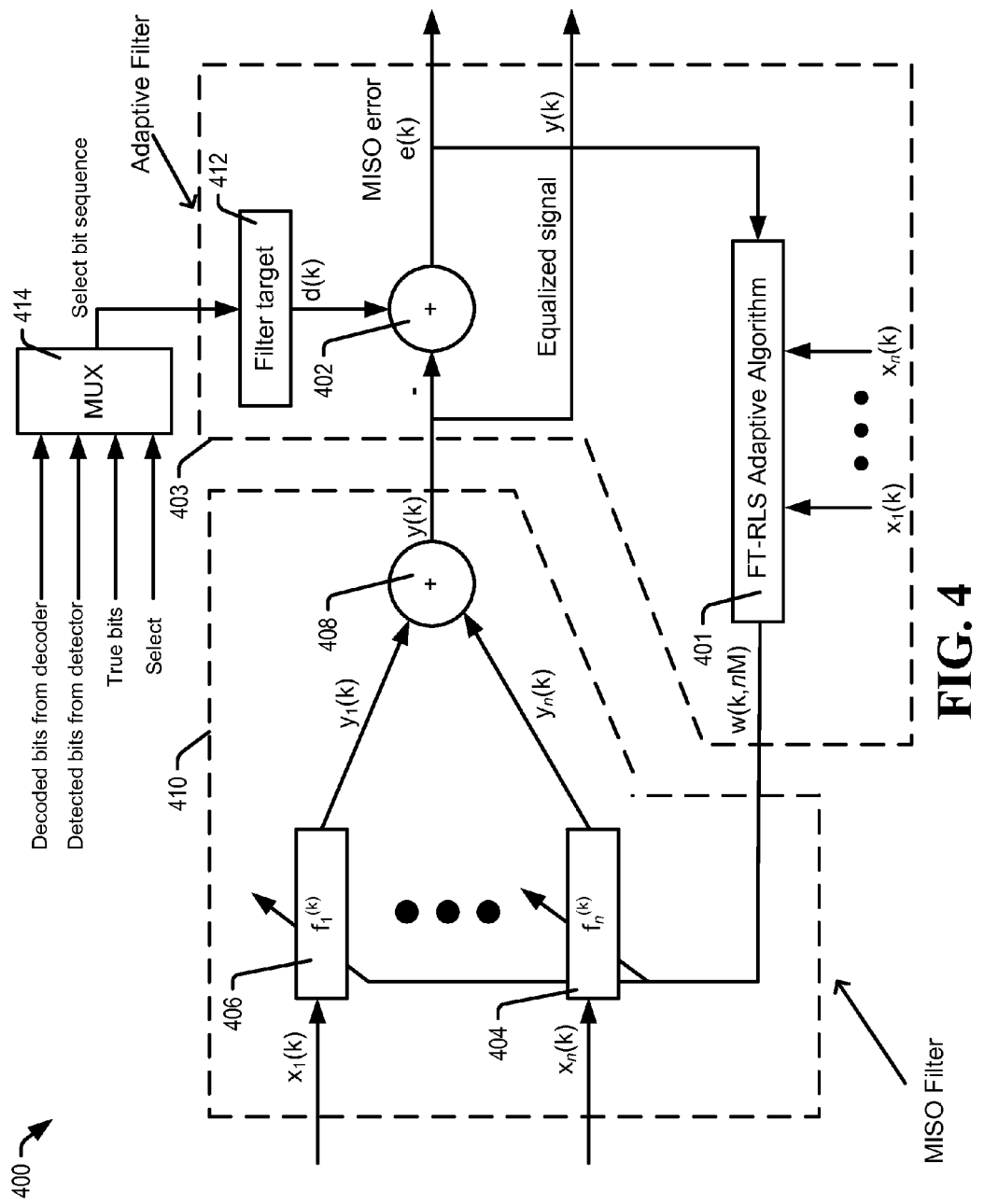
FIG. 4. is a system with a fast transversal MISO system, in accordance with certain embodiments of the present disclosure.

Referring to FIG. 4, a system with a fast transversal MISO system is shown and generally designated 400. System 400 is an example of a MISO filter circuit with a fast transversal recursive least-squares (FT-RLS) adaptive algorithm, and can be an embodiment of MISO filter circuits 101, 201, or 301.

The MISO filter circuit of system 400 can include a MISO filter circuit 410, an adaptive circuit 403, and a multiplexer (MUX) 414. The MISO filter circuit 410 can have n input adaptive filter circuits, including $f_1(k)$ 406 coupled to input signal $x_1$, input adaptive filter circuit $f_n(k)$ 404 coupled to input signal $x_n$, and a combiner circuit 408 coupled to the outputs of the adaptive filter circuits $f_1(k)$ 406 and $f_n(k)$ 404. The input adaptive filter circuits $f_1(k)$ 406 and $f_n(k)$ 404, and the combiner circuit 408 may be grouped together into one circuit, such as MISO filter circuit 410, implemented separately, or in other configurations. In some embodiments, not all n MISO filter circuit 410 inputs may receive a signal, and in some examples, signals may be applied to the MISO circuit 410 inputs in any order.

An adaptive filter circuit, such as input adaptive filter circuits $f_1(k)$ 406 and $f_n(k)$ 404, can be a computational device, such as a finite impulse response (FIR) filter, that filters input signals to produce an output signal in real time by changing (e.g. adjusting) the taps (e.g. coefficients) in response to the variation of an error signal and input signals. Note that "k" represents a point in time, and that f(k) (or x(k), etc.) is the value of a particular function at time "k". The input adaptive filter circuits $f_1(k)$ 406 and $f_n(k)$ 404, and the combiner circuit 408 may be implemented via application specific integrated circuits (ASIC), field-programmable gate arrays (FPGA), controllers, other circuits, firmware, software, or other means not listed. The combiner circuit may be a summing circuit, a convolution circuit, other circuit, or any combination thereof.

The adaptive circuit 403 can include an FT-RLS adaptive algorithm circuit 401, a combiner circuit 402, and the filter target circuit 412. The filter target circuit 412 can be filter target circuit 304, and may be integrated with the adaptive filter 403. The filter target circuit 412 can calculate the target signal, d(k), via the following equation:

$$d(k) = \sum_{i=0}^{Lg-1} g(i)b(k-i)$$

where g(i) is the target coefficient values, Lg is the length (i.e. number of taps) of the target filter, and b(k) is the select bit sequence provided by MUX circuit 414 at time "k". The target signal can be a reference signal.

The FT-RLS adaptive algorithm circuit, "FT-RLS circuit", 401 can receive input signals $x_1(k), \ldots, x_n(k)$, and MISO error signal e(k), and can produce weighting factors (i.e. taps, coefficients) via the overall tap vector for MISO with nM taps at time "k" w(k,nM). FT-RLS circuit 401 can be a processor with its own local memory, although in some embodiments, it may be implemented in firmware, software, or other circuits. In some embodiments, the combiner circuit 402 may be a separate circuit, implemented via ASIC, FPGA, controllers, software, etc., although in other embodiments, the combiner circuit 402 may be integrated with the FT-RLS circuit 401.

The input filters circuits $f_1(k)$ 406 and $f_n(k)$ 404 can receive input signals from sources such as analog to digital converters, antennae, signal acquisition circuits (e.g. signal acquisition front end one 104), and so forth, and can implement w(k,nM). For example, the adaptive circuit 403 can adjust the weighing factors (e.g. taps, coefficients) of the input adaptive filter circuits $f_1(k)$ 406 and $f_n(k)$ 404, which can filter the input signals to produce filtered signals that may be combined by the combiner 408 to produce an equalized output signal y(k). The equalized signal y(k) can couple to circuits in a channel circuit, such as a detector. In some embodiments, the equalized signal may couple to other circuits (not shown), such as feedback loops (e.g. timing loops, automatic gain control loops, etc.), channel quality block, buffer memory, other circuits, or any combination thereof. Embodiments of algorithms implemented by the RT-RLS circuit 401 are discussed later in this document.

The equalized signal y(k) may couple to combiner circuit, 402, which can be a summing circuit, convolution circuit, other circuit, or any combination thereof. The combiner circuit 402 can combine the equalized signal y(k) with d(k) to produce a MISO error signal e(k). For example, y(k) can have a value of A at time k, and d(k) can have a value of B at time k. The error signal e(k) may therefore have a value of e(k)=B−A at time k. The adjustment or update of MISO weights may be performed in the FT-RLS adaptive algorithm circuit 401 using the error signal e(k)=B−A. In some examples, the combiner circuit 402 may provide e(k) to circuits internal to the adaptive filter circuit 403, such as the FT-RLS circuit 401, and to external circuits, such as feedback loops. In other examples, the combiner circuit 402 may provide e(k) only to circuits within the adaptive filter circuit 403.

MISO filter circuits can have two or more inputs, and the inputs can have corresponding with adaptive filters. For example, a MISO filter circuit with four inputs can have four adaptive filter circuits, one combiner circuit configured to combine four signals, and an FT-RLS adaptive algorithm configured to produce weighting factors (e.g. taps, coefficients) for the four filters. All of the input adaptive filters of the MISO filter circuit use the same algorithm, although each filter may have a different number of taps.

As discussed in FIG. 1, recursive least squares (RLS) algorithms can have a higher complexity than equivalent LMS algorithms, require more computational power (e.g. processor operations), and have a faster convergence rate. FT-RLS algorithms may be more computationally efficient than RLS algorithms, and may use fewer processor operations to achieve the same result. Processors capable of handling increased operations may be expensive, both financially and physically (e.g. physical area, heat dissipation, power consumption, etc.).

MISO initialization may first be performed during the manufacturing process. MISO filter circuits may be re-initialized due to errors, such as a divergence (the FT-RLS algorithm fails to determine weighting factors), or as operating conditions change. Changes in operating conditions may be operating in a different zone of a data storage system, or moving wireless equipment from one location to another location having different radio-frequency (RF) properties (e.g. wall thickness, metal composition, etc.), and can affect signal to noise ratio (SNR) or other performance parameters. An example FT-RLS algorithm for MISO with n inputs is demonstrated by the following equations (refer to the parameter table of figure six for an explanation of terms):

Initialization:

$w_{f1}(-1, M) = w_{f2}(-1, M) = \ldots = w_{fn}(-1, M) = 0$      i.

$w_{b1}(-1, M) = w_{b2}(-1, M) = \cdots = w_{bn}(-1, M) = 0$      ii.

$w(-1, nM) = 0$      iii.

$k_1(-1, M) = k_2(-1, M) = \ldots = k_n(-1, M) = 0$      iv.

$\xi_{fmin1}(-1, M) = \xi_{fmin2}(-1, M) = \ldots = \xi_{fmin,n}(-1, M) = \eta$      v.

For k=0, . . . ,N:
The following loop for forward prediction error/filter taps calculator
For i=1, . . . , n (n is the number of MISO inputs)

$$e_{fi}(k, M) = x_i^T(k, M+1) \begin{bmatrix} 1 \\ -w_{fi}(k-1, M) \end{bmatrix} \qquad \text{vi.}$$

$$w_{fi}(k, M) = w_{fi}(k-1, M) + k_i(k-1, M)e_{fi}(k, M) \qquad \text{vii.}$$

$$\varepsilon_{fi}(k, M) = x_i^T(k, M+1) \begin{bmatrix} 1 \\ -w_{fi}(k, M) \end{bmatrix} \qquad \text{viii.}$$

$$\xi_{fmin,i}(k, M) = \lambda \xi_{fmin,i}(k-1, M) + e_{fi}(k, M)\varepsilon_{fi}(k, M) \qquad \text{ix.}$$

$$r_{fi}(k, M) = \varepsilon_{fi}(k, M)/\xi_{fmin,i}(k, M) \qquad \text{x.}$$

$$k_i(k, M+1) = \begin{bmatrix} 0 \\ k_i(k-1, M) \end{bmatrix} + r_{fi}(k, M) \begin{bmatrix} 1 \\ -w_{fi}(k, M) \end{bmatrix} \qquad \text{xi.}$$

End i
The following loop for backward prediction error/filter taps calculator
For j=1, . . . , n (n is the number of MISO inputs)

$$e_{bj}(k, M) = x_j^T(k, M+1) \begin{bmatrix} -w_{bj}(k-1, M) \\ 1 \end{bmatrix} \qquad \text{xii.}$$

$$r_{bj}(k, M) = 1 - e_{bj}(k, M)k_{j,M+1}(k, M+1) \qquad \text{xiii.}$$

$$\begin{bmatrix} k_j(k, M) \\ 0 \end{bmatrix} = \left[ k_j(k, M+1) - k_{j,M+1}(k, M+1) \begin{pmatrix} -w_{bj}(k-1, M) \\ 1 \end{pmatrix} \right] / r_{bj}(k, M) \qquad \text{xiv.}$$

$$w_{bj}(k, M) = w_{bj}(k-1, M) + k_j(k, M)e_{bj}(k, M) \qquad \text{xv.}$$

End j $$e(k, M) = d(k) - w^T(k-1, nM) \begin{bmatrix} x_1(k, M) \\ \vdots \\ x_n(k, M) \end{bmatrix} \qquad \text{xvi.}$$

Output of the FT-RLS adaptive algorithm circuit 401:

$$w(k, nM) = w(k-1, nM) + \begin{bmatrix} k_1(k, M) \\ \vdots \\ k_n(k, M) \end{bmatrix} e(k, M) \qquad \text{xvii.}$$

Implemented in the adaptive filter circuits $f_1$ 406, . . . , $f_n$ 404, and combiner circuit 408:

$$y(k) = w^T(k, nM) + \begin{bmatrix} x_1(k, M) \\ \vdots \\ x_n(k, M) \end{bmatrix} \qquad \text{xviii.}$$

End k
Note: bold formatting denotes a vector.
The above equations are but one example embodiment of a MISO filter with an FT-RLS adaptive algorithm. The adaptive circuit 403 can implement steps i through xvii to produce the overall tap vector for MISO w(k,nM), which may then be implemented by the MISO filter circuit 410 at step xviii. In other embodiments, mathematical operations i through xviii may be calculated or implemented in one circuit or more circuits.

The previous FT-RLS algorithm contains 2n division operations (two divisions per input per iteration per input). Equations x and xiv contain 2n division operations. Mathematical operations, such as division operations, can consume more resources and take more time to complete than other operations. For example, a processor may complete a multiplication operation 50 to 75 percent faster than a division operation, and less processing overhead. Reducing or eliminating time consuming operations can reduce overall cost, and speed up the convergence rate of the algorithm.

Experimental tests show that some parameters of the RLS algorithm are much smaller than other parameters. For example, $r_{fi}(k, M)$, i=1, . . . , n, from equation x is always a very small number because $\xi_{fmin,i}(k, M)$, i=1, . . . , n, are very large compared to $\epsilon_{fi}(k, M)$, i=1, . . . , n. Selectable constant values $\epsilon_i$, i=1, . . . , n, can be selected to estimate the inverse of $\epsilon_{fi}(k, M)$, i=1, . . . , n, thus replacing a division operation with a multiplication operation.

Referring to equation xiii, it can be shown the products $$e_{bj}(k, M)k_{j,M+1}(k, M+1), j = 1, \ldots, n,$$

are always very small. The expressions $1/r_{bj}(k, M), j=1, \ldots, n$, may be approximated as:

$$\gamma_j(k, M) = 1/r_{bj}(k, M) \approx 1 + e_{bj}(k, M)k_{j,M+1}(k, M+1),$$
$$j = 1, \ldots, n$$

The gain vectors in xiv may be re-written as:

$$\begin{bmatrix} k_j(k, M) \\ 0 \end{bmatrix} = \left[ k_j(k, M+1) - k_{j,M+1}(k, M+1) \begin{pmatrix} -w_{bj}(k-1, M) \\ 1 \end{pmatrix} \right] \gamma_j(k, M),$$
$$j = 1, \ldots, n$$

Further tests demonstrate that $e_{bj}(k, M)k_{j,M+1}(k, M+1)$, j=1, . . . , n, are so small that $\gamma_j(k, M)$, j=1, . . . , n, may be approximated by unity, thus removing their computation altogether. Approximating $\gamma_j$, j=1, . . . , n, as unity, and converting a division operation to a multiplication operation in equation x produces a simplified FT-RLS algorithm.

The simplified FT-RLS algorithm can be mathematically demonstrated by the following set of equations (refer to the parameter table of figure six for an explanation of terms):
Initialization:

$$w_{f1}(-1, M) = w_{f2}(-1, M) = \ldots = w_{fn}(-1, M) = 0 \qquad \text{i.}$$

$$w_{b1}(-1, M) = w_{b2}(-1, M) = \ldots = w_{bn}(-1, M) = 0 \qquad \text{ii.}$$

$$w(-1, nM) = 0 \qquad \text{iii.}$$

-continued $$k_1(-1, M) = k_2(-1, M) = \ldots = k_n(-1, M) = 0 \qquad \text{iv.}$$

$$\varepsilon_1 = \varepsilon_2 = \ldots = \varepsilon_n = 2^{-v} \text{ (}v\text{ is a positive integer)} \qquad \text{v.}$$

For k=0, . . . ,N:

The following loop for forward prediction error/filter taps calculator

For i=1, . . . , n (n is the number of MISO inputs)

$$e_{fi}(k, M) = x_i^T(k, M+1) \begin{bmatrix} 1 \\ -w_{fi}(k-1, M) \end{bmatrix} \qquad \text{vi.}$$

$$w_{fi}(k, M) = w_{fi}(k-1, M) + k_i(k-1, M)e_{fi}(k, M) \qquad \text{vii.}$$

$$\varepsilon_{fi}(k, M) = x_i^T(k, M+1) \begin{bmatrix} 1 \\ -w_{fi}(k, M) \end{bmatrix} \qquad \text{viii.}$$

$$\xi_{fmin,i}(k, M) = \lambda \xi_{fmin,i}(k-1, M) + e_{fi}(k, M)\varepsilon_{fi}(k, M) \qquad \text{ix.}$$

$$r_{fi}(k, M) = \varepsilon_{fi}(k, M)\varepsilon_i \qquad \text{x.}$$

$$k_i(k, M+1) = \begin{bmatrix} 0 \\ k_i(k-1, M) \end{bmatrix} + r_{fi}(k, M) \begin{bmatrix} 1 \\ -w_{fi}(k, M) \end{bmatrix} \qquad \text{xi.}$$

End i

The following loop for forward prediction error/filter taps calculator

For j=1, . . . , n (n is the number of MISO inputs)

$$e_{bj}(k, M) = x_j^T(k, M+1) \begin{bmatrix} -w_{bj}(k-1, M) \\ 1 \end{bmatrix} \qquad \text{xii.}$$

$$\begin{bmatrix} k_j(k, M) \\ 0 \end{bmatrix} = \begin{bmatrix} k_j(k, M+1) - k_{j,M+1}(k, M+1) \begin{pmatrix} -w_{bj}(k-1, M) \\ 1 \end{pmatrix} \end{bmatrix} \qquad \text{xiii.}$$

$$w_{bj}(k, M) = w_{bj}(k-1, M) + k_j(k, M)e_{bj}(k, M) \qquad \text{xiv.}$$

End j $$e(k, M) = d(k) - w^T(k-1, nM) \begin{bmatrix} x_1(k, M) \\ \vdots \\ x_n(k, M) \end{bmatrix} \qquad \text{xv.}$$

Output of the FT-RLS adaptive algorithm circuit 401:

$$w(k, nM) = w(k-1, nM) + \begin{bmatrix} k_1(k, M) \\ \vdots \\ k_n(k, M) \end{bmatrix} e(k, M) \qquad \text{xvi.}$$

Implemented in the adaptive filter circuits $f_1$ 406, . . . ,$f_n$ 404, and combiner 408:

$$y(k) = w^T(k, nM) \begin{bmatrix} x_1(k, M) \\ \vdots \\ x_n(k, M) \end{bmatrix} \qquad \text{xvii.}$$

End k

Note: The parameter v can be determined during manufacturing, but may change due to changes in operating conditions, calibration, or other factors.

The above equations are but one example embodiment of a MISO filter with a simplified FT-RLS algorithm. The adaptive circuit 403 can implement steps i through xvi to produce the overall tap vector for MISO w(k,nM), which may then be implemented by the MISO filter circuit 410 at step xvii. In other embodiments, mathematical operations i through xvii may be calculated or implemented in one or more circuits.

The simplified FT-RLS algorithm can be expanded to accommodate three or more inputs. The algorithm may also be configured to operate when some of the input signals are removed or in an inactive state. For example, an algorithm configured to filter three input signals can be automatically or manually reconfigured when one of the input signals is inactive (e.g. source is removed, floating input signals, etc.).

Figure 5:
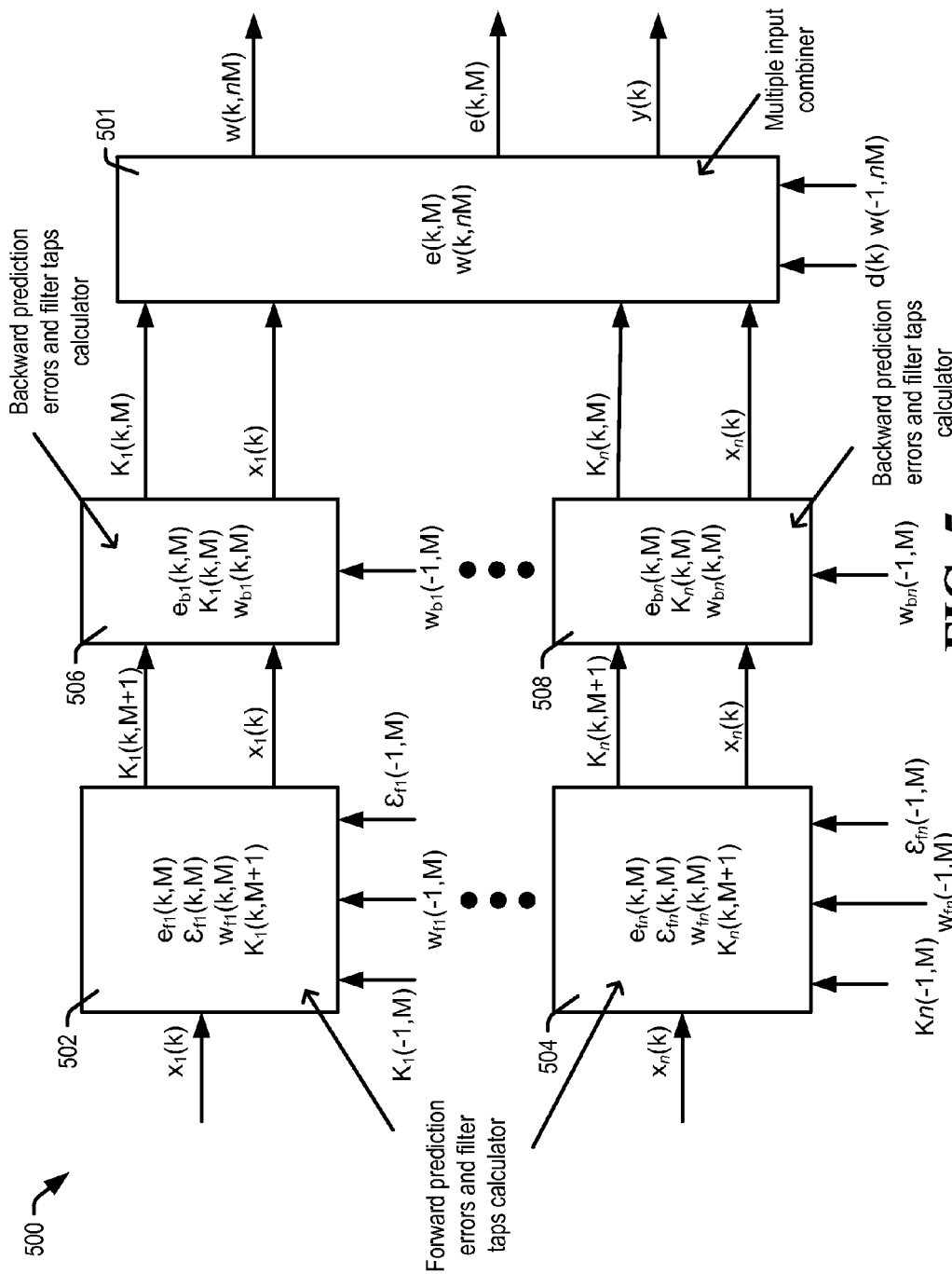
FIG. 5 is a system with a simplified fast transversal MISO system, in accordance with certain embodiments of the present disclosure.

Referring to FIG. 5, a system of simplified fast transversal algorithms for MISO filters is shown and generally designated 500. System 500 is an example of a MISO filter circuit with a fast transversal recursive least-squares (FT-RLS) adaptive algorithm, and can be an embodiment of MISO filter circuits 101, 201, 301, and 400. System 500 can include forward prediction error/filter taps calculator circuits 502 and 504, backward prediction error/filter taps calculator circuits 506 and 508, and multiple input combiner calculator circuit 501, all of which may be implemented via ASICs, FPGAs, controllers, system on chip, firmware, software, by other means, or any combination thereof, and may be integrated in a system on chip, or may be separate. The multiple input combiner circuit 501 can include an error calculator, a weight adapter, and output filter/combiner. The forward prediction error/filter taps calculator circuits 502 and 504, and backward prediction prediction/filter taps calculator circuits 506 and 508, can adjust the forward and backward prediction error/filter taps calculator circuits, respectively, and update or adjust intermediate gain vectors $k_1$, . . . , $k_n$. The gain vectors $k_1$, . . . , $k_n$ may then be combined by multiple input combiner calculator circuit 501 to produce the overall tap vector for MISO w(k,nM), which can be used with inputs $x_1(k)$, . . . , $x_n(k)$ to produce output y(k).

Both the FT-RLS algorithm and the simplified FT-RLS algorithm can minimize the mean square error (MSE) between the target output, d(k), and the actual output, y(k), by using a minimum number of input samples to converge to an optimum minimum MSE (MMSE) solution without involving the computational complexity of performing divisions or matrix inversions. The MMSE is a criterion, or metric, used to measure the performance of the underlying algorithm.

FIG. 4 and FIG. 5 may be different representations of the same system. For example, system 400 can be a functional block diagram that illustrates the operation of the system; the relationship between the functions (e.g. adaptive filter functions) and the MISO filter. Portions of the FT-RLS algorithm may be used in some functions; the adaptive functions can include all of the steps of the FT-RLS algorithm except for the last step, which can be performed by the MISO filter.

System 500 is identical to system 400, but can be a circuit diagram illustrating how the FT-RLS algorithm is implemented. For example, the circuits in system 500 perform calculations that may be implemented by the functions of system 400. The forward prediction error/filter taps calculator circuits 502 and 504, and the backward prediction error/filter taps calculator circuits 506 and 508 can calculate steps of the FT-RLS algorithm that may be intermediate. The multiple input combiner circuit 501 can calculate the overall tap vector for MISO w(k,nM), which can be implemented by input adaptive filter circuits $f_1(k)$ 406 and $f_n(k)$ 404.

Referring to FIG. 6, parameter table for fast transversal algorithms for MISO filters is shown and generally designated 600.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit including:
      a first input to receive a first signal;
      a second input to receive a second signal, the second input different and distinct from the first input;
      a first filter circuit adapted to determine first weighting coefficients and second weighting coefficients based on the first signal, the second signal, and an error signal, and a recursive least square (RLS) process;
      a second filter circuit adapted to modify the first signal via the first weighting coefficients to produce a first filtered signal, and modify the second signal via the second weighting coefficients to produce a second filtered signal;
      a first combiner circuit adapted to combine the first filtered signal and the second filtered signal to produce a combined signal;
      a reference signal generator circuit configured to generate a reference signal based on a bit sequence;
      a second combiner circuit adapted to combine the reference signal and the combined signal to produce the error signal; and
      an output to provide the combined signal.

2. The apparatus of claim 1 further comprising:
   the circuit configured to receive a number "n" of inputs where n is greater than or equal to two.

3. The apparatus of claim 2 further comprising:
   the first combiner circuit configured to combine n signals to produce the combined signal.

4. The apparatus of claim 3 further comprising:
   the first filter circuit configured to determine n weighting coefficients based on the n signals.

5. An apparatus comprising:
   a circuit including:
      a first input to receive a first signal;
      a second input to receive a second signal;
      a reference signal generator circuit configured to generate a reference signal based on a bit sequence; and
      an output to provide a combined signal; and
   a channel circuit including:
      a first filter circuit adapted to determine first weighting coefficients and second weighting coefficients based on the first signal, the second signal, and an error signal;
      a second filter circuit adapted to modify the first signal via the first weighting coefficients to produce a first filtered signal, and modify the second signal via the second weighting coefficients to produce a second filtered signal;
      a first combiner circuit adapted to combine the first filtered signal and the second filtered signal to produce the combined signal;
      a second combiner circuit adapted to combine the reference signal and the combined signal to produce the error signal;
      a detector circuit configured to receive the combined signal and produce a detected signal;
      a decoder circuit configured to receive the detected signal and produce a decoded signal; and
      a buffer circuit configured to store the decoded signal.

6. The apparatus of claim 1 further comprising:
   a data storage device including a data storage medium, a controller, an interface, and a data communication channel coupled to the first signal and the second signal; and
   the data communication channel includes the circuit, and is adapted to provide the combined signal to a buffer circuit.

7. The apparatus of claim 1 further comprising:
   the first filter circuit does not use a division operation to calculate the combined signal and the error signal.

8. An apparatus comprising:
   a circuit including:
      a first input to receive a first signal;
      another input to receive another signal;
      a first forward error calculator circuit adapted to calculate a first extended gain vector based on the first signal, a first offset gain vector, a first forward prediction filter value, and a first aposteriori prediction error value;
      another forward error calculator circuit adapted to calculate another extended gain vector based on the another signal;
      a first backwards error calculator circuit adapted to calculate a first gain vector based on the first extended gain signal;
      another backwards error calculator circuit adapted to calculate another gain vector based on the another extended gain vector; and
      a multiple input combiner circuit adapted to calculate an output signal, an error signal, and an overall tap vector based on the first signal, the another signal, the first gain vector, and the another gain vector.

9. The apparatus of claim 8 further comprising:
   the first backwards error calculator circuit configured to calculate the first gain vector based on the first signal, the first extended gain vector, and a backwards prediction filter value.

10. The apparatus of claim 9 further comprising:
    the another forward error calculator circuit adapted to calculate the another extended gain vector based on the another signal, another offset gain vector, another forward prediction filter value, and another aposteriori prediction error value.

11. The apparatus of claim 10 further comprising:

the another backwards error calculator circuit configured to calculate the another gain vector based on the another signal, the another extended gain vector, and another backwards prediction filter value.

12. The apparatus of claim 11 further comprising:

a multiple input combiner circuit adapted to combine the first signal, the another signal, the first gain vector, the another gain vector, a reference signal, and an offset overall tap vector to produce the combined signal, the error signal, and an overall tap vector.

13. The apparatus of claim 12 further comprising:

a reference signal generator circuit configured to generate the reference signal based on a bit sequence.

14. A method comprising:

receiving, at a first signal acquisition circuit, a first signal at a first input;

receiving, at a second signal acquisition circuit, another signal at another input;

filtering, via a multiple input single output (MISO) system, the first signal via a recursive least square (RLS) process using first weighting coefficients corresponding to the first signal to produce a first filtered signal;

filtering, via the MISO system, the another signal via the RLS process using another weighting coefficients corresponding to the another signal to produce another filtered signal;

combining, via the MISO system, the first filtered signal and the another filtered signal to produce an output signal;

combining, at a filter circuit, the output signal with a reference signal to produce an error signal;

calculating the first weighting coefficients and the another weighting coefficients based on the first signal, the another signal, and the error signal; and providing the output signal and the error signal as outputs from the filter circuit and the MISO system.

15. The method of claim 14 further comprising:

calculating a first gain vector based on the first signal, a first extended gain vector, and a backwards prediction filter value.

16. The method of claim 15 further comprising:

calculating another extended gain vector based on the another signal, another offset gain vector, another forward prediction filter value, and another aposteriori prediction error value; and calculating another gain vector based on the another signal, another extended gain vector, and another backwards prediction filter value.

17. The method of claim 16 further comprising:

combining the first signal, the another signal, the first gain vector, the another gain vector, the reference signal, and an offset overall tap vector to produce the output signal, the error signal, and an overall tap vector.

* * * * *